United States Patent [19]

Roggendorf

[11] Patent Number: 5,018,027
[45] Date of Patent: May 21, 1991

[54] METHOD OF AND MEANS FOR PROVIDING INFORMATION TO EDIT A VIDEO TAPE

[75] Inventor: Peter Roggendorf, Kaestrech, Fed. Rep. of Germany
[73] Assignee: GSE, Inc., New York, N.Y.
[21] Appl. No.: 349,690
[22] Filed: May 10, 1989
[51] Int. Cl.⁵ ............................................. G11B 27/02
[52] U.S. Cl. .................... 360/14.2; 360/14.3
[58] Field of Search .................... 360/14.3, 14.2, 72.2; 388/314

[56] References Cited

U.S. PATENT DOCUMENTS 3,681,524 8/1972 Nicholls ............................. 360/14.3

Primary Examiner—Vincent P. Canney
Attorney, Agent, or Firm—Jones Day Reavis & Pogue

[57] ABSTRACT

A method of and apparatus for editing half-inch tape used for home recording of video material applies pulse-width modulation to prerecorded synchronizing pulses in predetermined time intervals. The interval is started with an eleven-bit header that is compatible with that of a commercially available system known as the VASS system. Time blocks are then encoded by pulse-width modulation with information identifying the particular recording session and the number of elapsed seconds minutes and hours since the beginning of the session. A check code completes the modulation during the interval for television systems such as PAL and SECAM that are adapted for fifty-Hz operation. For systems such as NTSC that operate at sixty Hertz, a ten-bit dummy code is added to complete the two-second interval. The code is entered without writing over the leading edge of the prerecorded synchronizing pulse, allowing the timing of those pulses to continue without interruption. Using this system, an editor can locate any desired interval and can then locate an individual frame within that interval by counting synchronizing pulses. The apparatus of the invention inserts and detects the header, inserts and detects the address code, inserts time signals in sequence, and detects a selected time interval and frame within that interval. An electronic circuit processes signals derived from the tape for input to a microprocessor which controls displays, insertion of codes, and advancing to a chosen edit location.

28 Claims, 3 Drawing Sheets

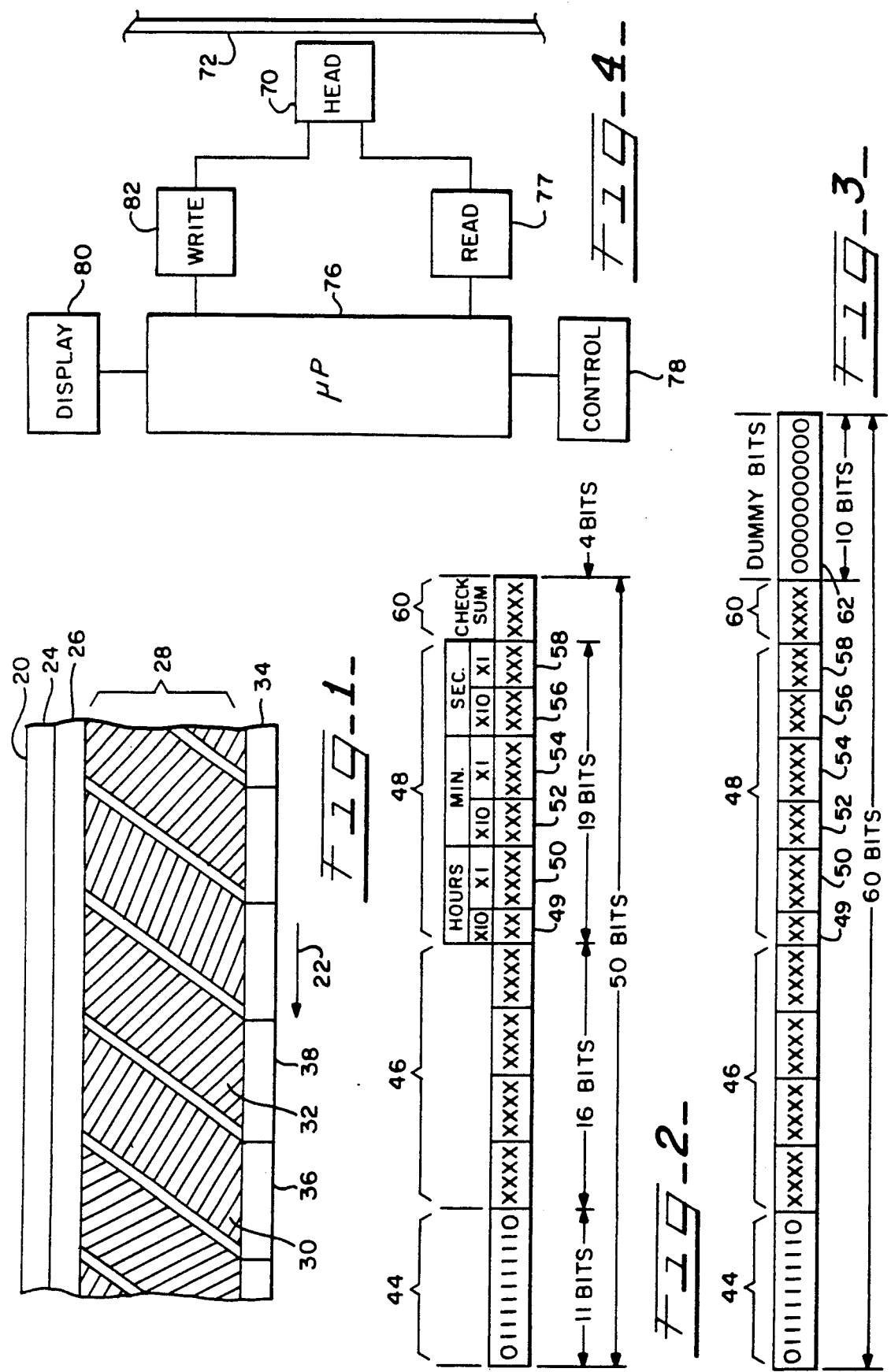

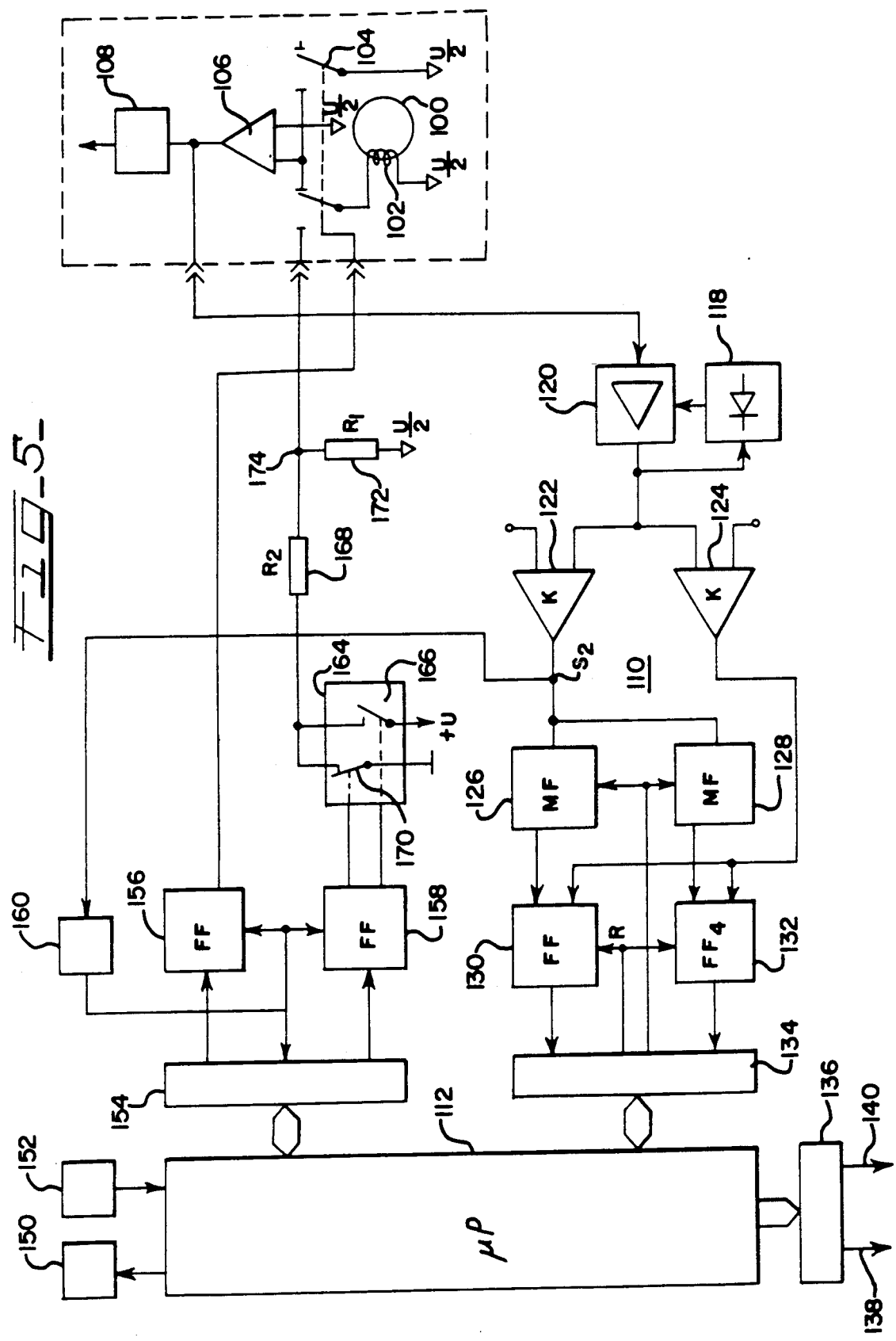

METHOD OF AND MEANS FOR PROVIDING INFORMATION TO EDIT A VIDEO TAPE

BACKGROUND OF THE INVENTION

This invention is related to a method of and means for identifying a precise location on a video tape so as to facilitate editing of the tape.

In order to edit video tape it is necessary both to identify the location of desired program material and to preserve the synchronization of the edited material so that the program material is continuous and free of interruptions caused by momentary loss of synchronization. Several systems are used in professional recorders made for video tape that is ¾-inch or more in width. However, most tape used in home video systems is ½-inch in width. Such tape may be either in the form of a cassette or it may be designed for reel-to-reel use. In either case, this video tape is normally sold with synchronizing bits magnetically encoded in a synchronization track. Two changes of magnetic flux, comprising together a single rectangular or square pulse, are recorded to serve as a synchronizing pulse for each frame of the picture that is being recorded. Each such frame represents a two-to-one interlace of the video raster, so that the frequency of the synchronizing pulses is 30 Hz for the NTSC system used in the United States and other countries on a 60-Hz power system and 25 Hz for systems designed for use with the PAL and SECAM systems that are used in Europe and other areas where the power frequency is 50 Hz.

The foregoing features are a part of the Video Home System (VHS) that is in common use for home video recording. In this system, synchronization of recording is achieved by deriving a pulse from differentiating the leading edge of the synchronizing pulse. The portion of the pulse after the leading edge is not normally involved in synchronizing the operation.

Editing of video tapes requires that the synchronization be maintained in order to avoid distracting jumps or other interruptions in the picture. The process of editing also requires that the editor have some measure of the location of areas on the tape at which to add material to the tape or delete it from the tape. The systems in common use are typified by the broad teachings of U.S. Pat. No. 4,167,028, entitled "Method And An Apparatus For Time Signal Encoding/Decoding," assigned to the assignee of the present invention. The '028 patent teaches, inter alia, pulse-width modulation of the synchronization pulses over an interval of one second, defined by thirty synchronizing pulses in a 60-Hz system to identify the particular interval in terms of hours, minutes and seconds from an arbitrary starting time Individual frames can than be identified within that interval by counting bits within the interval.

A system similar in some ways to that of the '028 patent was disclosed in my U.S. Pat. No. 4,703,311, entitled "Method And Apparatus For Transferring An Information Code Onto The Synchronization Track Of A Video Tape And A Video Tape Produced According To Said Method." The '311 patent encodes over the existing sync pulses. The system of the '311 patent is a single-frame retrieval and access program in digital code that has been sold under the registered trademark RAPID. This system encoded an eight-bit header or starting section, a data field of twenty bits to encode five BCD numbers, a user field of sixteen bits to contain four BCD numerals, and an end section of six bits. The total number of bits that were entered by extending the portion of the synchronizing pulse that followed the leading edge to effect pulse-width modulation of the synchronizing pulses was thus fifty bits, occupying two seconds in a 50-Hz system.

A system that is in use for editing VHS tapes is VASS. This is an acronym for VHS Address and Search System, which was described in IEEE Transactions on Consumer Electronics, Volume CE-33, Number 3, August 1987, at page 220. VASS uses pulse-width modulation of the synchronizing pulse by extending the trailing edge of the pulse to produce a wider pulse representing a binary "0" and shortening it to produce narrower pulse representing a binary "1." VASS places a specified eleven-bit header, four four-bit BCD numbers in the next sixteen bits, and a four-bit closing header. This pattern is repeated three times over an interval of about 3.1 seconds. Individual frames can then be determined by counting synchronizing pulses within the interval.

The VASS system has several disadvantages. One disadvantage is that the time interval that is identified by VASS coding is approximately 3.1 seconds in length. Locating a desired interval and then locating a particular desired frame within that interval can take an appreciable amount of time. It would be useful to have a shorter identifying interval so as to speed the location of a desired frame within the interval Another disadvantage of the VASS system is its encoding of only four BCD numbers, thus spanning the range from 0000 to 9999. This is a time span of about 8½ hours. It would be easier for an editor to select frames by using an identifier that is related to seconds, minutes and hours, preferably over a range of twenty-four hours.

The header of the VASS system is a binary "0" followed by nine binary "1s", then a binary "0." It would be useful to have an improved system that uses the same header so as to be compatible with the VASS system.

OBJECT OF THE INVENTION

It is an object of the present invention to provide a new and better method of and means for recording information on the synchronization track of a video tape.

It is a further object of the present invention to provide an improved method of and means for altering a set of pre-recorded synchronization pulses on a video tape to identify a location on the video tape within a two-second interval.

It is a further object of the present invention to provide a method of and means for recording information on synchronizing pulses of half-inch video tape so as to be compatible with an existing Retrieval and Access Program In Digital (RAPID) system.

It is a further object of the present invention to provide a method of and means for recording information on synchronizing pulses of half-inch video tape so as to be compatible with the existing VHS Address Search System (VASS)

It is a further object of the present invention to provide a method of and means for recording information on synchronizing pulses of half-inch video tape so as to be usable with a PAL or SECAM system at fifty-Hz and also with an NTSC system at sixty-Hz.

SUMMARY OF THE INVENTION

A method of and means for editing half-inch tape used for home recording of video material applies pulse-width modulation to prerecorded synchronizing pulses in predetermined time intervals. The interval is started with an eleven-bit header that is compatible with that of a commercially available system known as the VASS system. Time blocks are then encoded by pulse-width modulation with information identifying the particular recording session and the number of elapsed seconds, minutes and hours since the beginning of the session A check code completes the modulation during the interval for television systems such as PAL and SECAM that are adapted for fifty-Hz operation. For systems such as NTSC that operate at sixty Hz, a ten-bit dummy code is added to complete a two-second interval if this is desired. The code is entered without writing over the leading edge of the prerecorded synchronizing pulse, allowing the timing of those pulses to continue without interruption. Using this system, an editor can locate any desired interval of, say, two seconds or the like, and can then locate an individual frame within that interval by counting synchronizing pulses. The apparatus of the invention inserts and detects the header, inserts and detects the address code, inserts time signals in sequence, and detects a selected time interval and frame within that interval.

BRIEF DESCRIPTION OF THE DRAWINGS

FIG. 1 is a view of a VHS tape showing regions for entering data and synchronizing pulse.

FIG. 2 is a schematic view of the information code of the present invention for use on a fifty-Hz system.

FIG. 3 is a schematic view of the information code of the present invention for use on a sixty-Hz system.

FIG. 4 is a functional block diagram of an apparatus for inserting and reading the code of the present invention.

FIG. 5 is an operational diagram of a circuit for realizing the block diagram of FIG. 4.

DETAILED DESCRIPTION OF THE INVENTION

Figure 6:
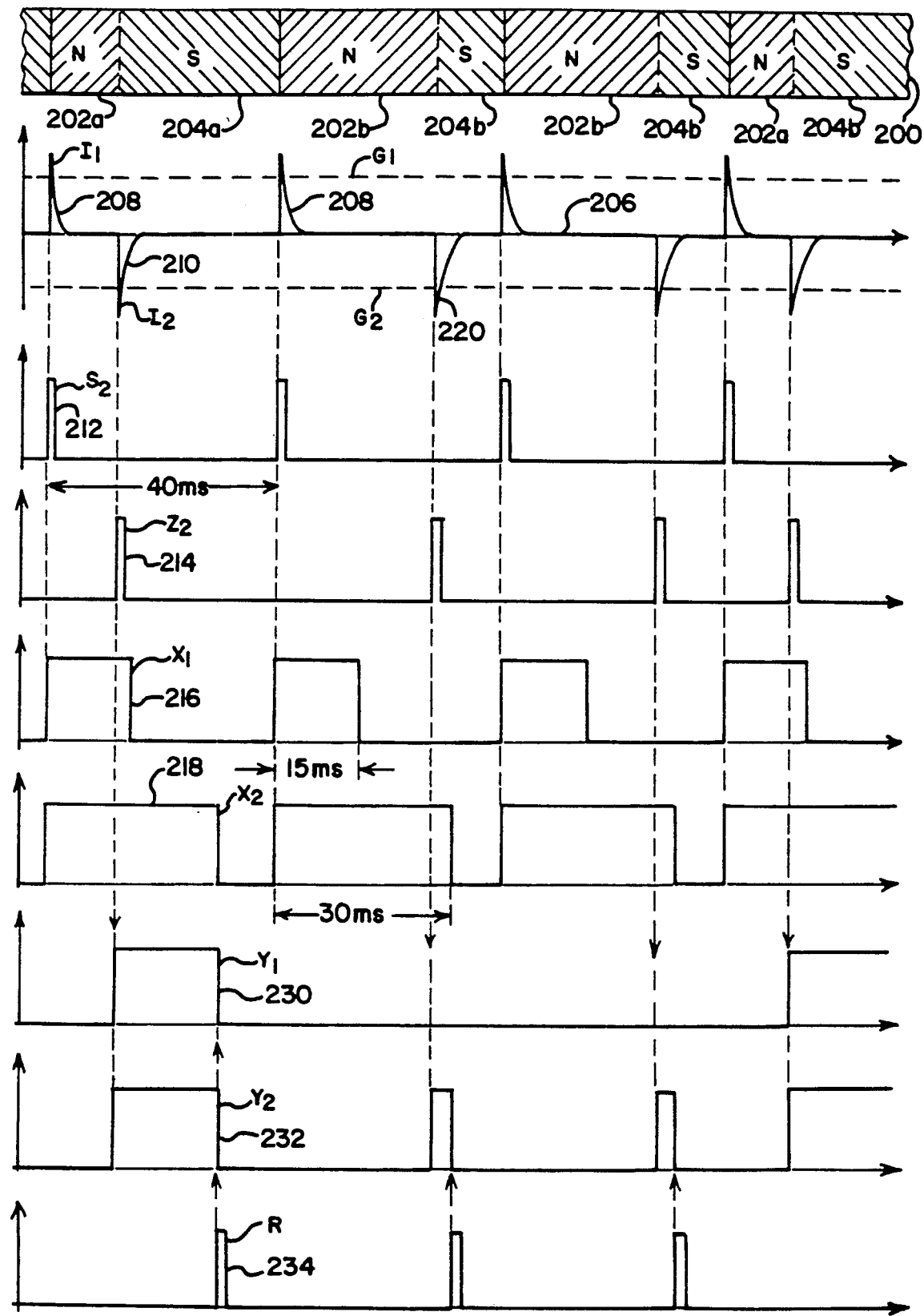
FIG. 6 is a set of time plots of selected waveforms in FIG. 5.

FIG. 1 is a view of a portion of a VHS tape showing regions of different magnetization on the tape. In FIG. 1 a tape 20 is considered to be moving in the direction of an arrow 22 in normal recording and playback modes. The tape 20 includes a pair of audio tracks 24 and 26 and a region 28 that includes a succession of pairs of helically scanned video tracks 30 and 32. Each pair of video tracks 30 and 32 represents one full sweep of the screen. The two are combined in the conventional two-to-one interlace to produce a single frame of the television picture. A control track 34 comprises differently magnetized regions 36 and 38. The regions 36 and 38 may be magnetized oppositely or they may be magnetized in such a way that one of the regions 36 and 38 is magnetized and the other is unmagnetized. The regions 36 and 38 are typically produced on the tape 20 before any audio or video information is recorded on the tape.

Editing a video tape comprises combining material from two or more sources on a single video tape. If this is done without maintaining synchronization of the control track, the result is unacceptable jumps representing temporary loss of synchronization in the video picture. A preferred editing system maintains the control track 34 and synchronizes added material to it. It is also desirable to locate material to be inserted and regions for the inserting of material to the exact frame. The present invention is a better method and means of doing this.

FIG. 2 is a schematic view of the information code of the present invention for use on a fifty-Hz system, and FIG. 3 is a schematic view of the information code of the present invention for use on a sixty Hz system. The view of both FIG. 2 and FIG. 3 show the information encoded over a two-second interval on a video tape. This represents twenty-five frames for the fifty-Hz system of FIG. 2 and thirty frames for the sixty-Hz system of FIG. 3. Each of the bits indicated in FIGS. 2 and 3 is encoded on the control track of FIG. 1 by pulse-width modulation of the trailing edge of the magnetized pulse. This leaves the leading edge unaffected. Since the leading edge is used for synchronization, the modulation process does not affect synchronization of the video scans. In FIGS. 2 and 3 required binary codings are shown as "0" and "1." Binary digits that are to be entered according to their particular values are indicated as "X." Thus, in FIGS. 2 and 3, a header 44 comprises an initial binary 0, nine binary 1s and a binary 0. This is followed by a user code 46 that comprises four BCD numbers These numbers are separated by spaces in FIGS. 2 and 3, but will obviously appear in sequence without spaces on the tape. This is followed by a time code 48 which in the preferred embodiment comprises a four-bit BCD hours code 50, a three-bit BCD tens of-minutes code 52, a four-bit BCD minutes code 54, a three-bit tens-of-seconds code 56, and a four-bit BCD seconds code 58. A five-bit check sum code 60 comprises a binary 0 followed by four numbers reflecting a parity check on the encoded digits in the user code 46 and the time code 48. The bits enumerated above complete the encoding of editing information during a two-second interval for video signals encoded at a 25-Hz frequency that is associated with the PAL and SECAM systems. The fifty frames associated with the fifty bits of FIG. 2 thus occupy a two-second interval on the tape. FIG. 3 contains in addition a ten-bit dummy code 62 comprising ten binary 0s. The dummy code 62 maintains compatibility of the encoding system between fifty-Hz and sixty-Hz systems In either of these systems, the two-second interval is counted so it can be split by the microprocessor to enter individual seconds in the seconds code position.

FIG. 4 is a functional block diagram of an apparatus for inserting and reading the code of the present invention. In FIG. 4 a head 70 is placed so as to read signals from and enter signals on a tape 72. Signals read by the head 70 are taken through a read circuit 74 to a microprocessor 76. The combination of the read circuit 74 and the microprocessor 76 detects and decodes an encoded signal from the tape 72. The microprocessor 76 is controlled by a control unit 78 and it produces information that may be displayed on a display 80. Information generated by the microprocessor 76 is applied through a write circuit 82 to the head 70 to be entered as pulse width modulation on the tape 72. The read unit 74 is in continuous use when the tape 72 is being scanned to find a particular frame. The read unit 74 is also used when the write unit 82 is being used to write on the tape, since the beginning of an individual writing operation comprises identifying the synchronizing signal through the read unit 74.

FIG. 5 is a functional block diagram of an apparatus for inserting and reading the code of the present invention. In FIG. 4, a head 100 is placed to respond to the control code in a video tape. The head 100 induces signals in a coil 102 that is connected through a change-over switch 104 to an amplifier 106 then to a threshold detector 108 which produces a synchronizing pulse by differentiating the leading edge of a control pulse. The output of the threshold detector 28 is taken to a video recorder for use.

The output of the amplifier 106 is also taken to a reading circuit 110 which will identify the header 44 of FIGS. 2 and 3 and thereby set a timing pattern for recognition of a user code and the time codes of FIGS. 2 and 3 for input to a microprocessor 112. The reading circuit 110 includes an amplifier 120 that is controlled by a controller 122. The output of the amplifier 120 is taken to two threshold detectors 122 and 124. The output of the threshold detector 122 was taken as an input to a pair of monostable flipflops 126 and 128. Their outputs are taken to a pair of JK flipflops 130 and 132 respectively. The output of the flipflops 130 and 132 are taken through an interface 134 to the microprocessor 112 for evaluation. The microprocessor 112 is programmed to detect a header as an indication of an incoming code and to identify the user and the time signal associated with the interval for that header. This information may be taken through an interface 136 to a line 138 leading to a video recorder and a line 140 leading to a video player. It should be emphasized that the reading circuit 110 is a pulse-shaping and discriminating circuit that, together with the microprocessor 112, provides the preferred means of using the information encoded on the control channel. Other analog or digital circuits could equally as well be used to identify and detect the header, user code and time signals.

The microprocessor 112 may be connected to a display device 150 and an input device 152. The display 150 is typically used to show a user code and either a detected time signal or one that has been entered for editing. The input device 152 allows external control of the microprocessor 112. When it is desired to encode a tape during recording, the microprocessor 112 is connected through an interface 154 with a pair of flipflops 156 and 158. Timing of the encoding is controlled by a signal from the threshold detector 122 which is taken to a logical circuit 160 which produces a timing pulse for the flipflops 156 and 158. The timing pulse is also available for the interface 154. In the alternative, if it is desired to enter complete control pulses on a tape, with or without the encoding of the present invention, this can be done by supplying timing pulses to the flipflops 156 and 158 from the microprocessor 112 through the interface 154.

The output of the flipflop 156 controls the changeover switch 104 which switches from a playback to a recording mode. The output of the flipflop 158 is taken to an electronic switching device 164 which either operates a switch 166 to apply a positive voltage of a predetermined level to a resistor 168 or else operates a switch 170 to apply ground to the resistor 168. The resistor 168 is connected to a resistor 172 to form a voltage divider on a voltage that is half the predetermined value. The result is to apply at a junction 174 a voltage that will produce a current that may magnetize the tape in either direction. The voltage at the terminal 174 is applied through the changeover switch 104 to the coil 102 to apply the code of FIG. 2 or FIG. 3 to a tape.

FIG. 6 is a set of time plots obtained in the circuit of FIG. 5 as related to the synchronizing pulses on tape from which they are obtained. In FIG. 6, a tape 200 is magnetized with an indication of an exposed north pole in regions 202 and of a south pole in regions 204. The tape 200 is supposed to be moving to the left in FIG. 6, and the transition from a south pole to a north pole is the leading edge of each of the pulses. The effect of passing the tape 200 passed ahead is to differentiate the synchronizing wave form to produce pulses These pulses are shown in curve 206 which is a time plot of the input wave form to the amplifier 102. The first transition from south to north produces a pulse 208 and the first transition from north to south produces a pulse 210 in the opposite direction. When the pulse 208 exceeds the threshold G1, the comparator 122 produces the output 212. When the pulse 210 exceeds the threshold G2, the comparator 124 of FIG. 5 produces the output 214. The pulse 212 triggers the monostable 126 of FIG. 5, producing the output 216 which is taken as an input to the flipflop 130. The pulse 212 is also taken to the monostable 128 of FIG. 5 which produces the output 218 of FIG. 6. The monostable 128 is set to have a longer time interval than the monostable 126. In a typical operation, the monostable 126 is set for a time interval of fifteen milliseconds, while the monostable 128 is set to have a time interval of thirty milliseconds. These times are typical of a tape that is encoded for fifty Hertz.

The encoded regions 202 and 204 of the tape in FIG. 6 differ in the location of the transition from region 202 to 204. The wave forms 212 through 218 are all derived from the leading edge of the synchronizing pulse. Consider now the tape 200 in which the location of the transition between the north poles 202 and the south poles 204 have been varied to encode the tape for the practice of the present invention. Thus the regions 202a are short in comparison with the regions 204a, while the regions 202b are long in comparison with the regions 204b. As a result, the pulse 210 is timed differently from the synchronizing pulse 208 than is the pulse 220 with respect to its synchronizing pulse 208. The result of this becomes apparent in looking at the signal 230 which is the output of the flipflop 130. The pulse 230 occurs in response to the pulse 210 representing a particular binary encoding of the tape 200 associated with intervals 202a and 204a. However in response to the pulse 220, representing the transition from 202b to 204b, the flipflop 130 produces no output. This therefore represents a decoding of the binary signal on the tape 200. The signal 232 represents the output of the flipflop 132 which is gated on by either the pulse 210 or the pulse 220, but is gated off by a reset signal 234 from the microprocessor 112. It can be seen that the encoded pulses 202a and 204a on the one hand and 202b and 204b on the other have been decoded to provide identifying inputs to the microprocessor 112.

The preceding description is intended to illustrate the preferred embodiment of the invention. It is intended to illustrate and not to limit the scope of the invention, which extends to the breadth of the appended claims.

We claim:

1. A method of applying an information code to identify a predetermined interval on a synchronizing track of a video recording tape of which the synchronizing track contains a magnetized rectangular synchronizing pulse for each frame, the magnetizing pulse including a leading edge that is used to develop a synchronizing signal, the method comprising the steps of:

(a) entering an identifying header on eleven consecutive synchronizing pulses;
(b) entering a four digit BCD user code on sixteen consecutive synchronizing pulses following the header;
(c) entering a time code in BCD on nineteen consecutive synchronizing pulses following the user code; and
(d) entering a check sum on four consecutive synchronizing pulses following the time code to complete entry of the information code
whereby the information code is applied to fifty consecutive bits that span a predetermined interval in a system that operates at fifty Hertz.

2. The method of claim 1 comprising in addition the steps of entering a dummy code in ten synchronizing pulses following the check sum to complete the synchronizing code in sixty bits, whereby the synchronizing code spans a predetermined interval in a system that operates at sixty Hertz.

3. The method of claim 1 wherein the header comprises a binary zero, nine consecutive binary ones, and a binary zero.

4. The method of claim 1 wherein the time code comprises a tens-of-hours code, an hours code, a tens-of-minutes code, a minutes code, a tens-of-seconds code, and a seconds code, whereby the time code is adapted to identify intervals to the second over a time of twenty-four hours 5. A method of identifying an individually numbered frame within a desired interval of a predetermined length on a video tape having a synchronizing signal that has a magnetized rectangular synchronizing pulse for each frame and an applied information code within the desired interval and within a second interval of substantially the same length immediately preceding the desired interval, the method comprising the steps of:
(a) detecting a header in the second interval to identify a beginning of identification;
(b) detecting a user code in the second interval;
(c) detecting a desired time code in the second interval that immediately precedes the desired interval;
(d) detecting a check sum in the second interval and also termination of the second interval to indicate completion of the second interval and beginning of the desired interval; and
(e) counting synchronizing pulses in the desired interval until the number of the individual frame is reached.

6. A method of applying an information code to identify an interval of a predetermined length on a synchronizing track of a video recording tape of which the synchronizing track contains a magnetized rectangular synchronizing pulse for each frame, the magnetizing pulse including a leading edge that is used to develop a synchronizing signal and a trailing edge that is pulse-width modulated to enter the information code, the method comprising the steps of:
(a) entering an identifying header on eleven consecutive synchronizing pulses;
(b) entering a four-digit BCD user code on about sixteen consecutive synchronizing pulses following the header;
(c) entering a time code in BCD on about nineteen consecutive synchronizing pulses following the user code; and
(d) entering a check sum on about four consecutive synchronizing pulses following the time code to complete entry of the information code,
whereby the information code is applied to fifty consecutive bits that span a predetermined interval in a fifty-Hz system.

7. The method of claim 6 wherein the time code comprises a two-bit tens-of-hours code, a four-bit BCD hours code, a three-bit BCD tens-of-minutes code, a four-bit BCD minutes code, a three-bit BCD tens-of-seconds code, and a three-bit BCD seconds code, whereby the time code is adapted to identify intervals to the second over a time span of twenty-four hours.

8. An apparatus for applying an information code to identify an interval of a predetermined length on a synchronizing track of a video recording tape of which the synchronizing track contains a magnetized rectangular synchronizing pulse for each frame, the magnetizing pulse including a leading edge that is used to develop a synchronizing signal, the apparatus comprising in combination:
(a) means for entering an identifying header on eleven consecutive synchronizing pulses;
(b) means for entering a four-digit BCD user code on sixteen consecutive synchronizing pulses following the header;
(c) means for entering a time code in BCD on nineteen consecutive synchronizing pulses following the user code; and
(d) means for entering a check sum on four consecutive synchronizing pulses following the time code to complete entry of the information code,
whereby the combined means apply the information code to fifty consecutive bits that span the interval of the predetermined length in a system that operates at fifty Hertz.

9. The apparatus of claim 8 comprising in addition means for entering a dummy code in ten synchronizing pulses following the time code to complete the synchronizing code in sixty bits, whereby the synchronizing code spans the interval of predetermined length in a system that operates at sixty Hertz.

10. The apparatus of claim 8 wherein the header comprises a binary zero, nine consecutive binary ones, and a binary zero.

11. The apparatus of claim 8 wherein the time code comprises a ten-of-hours code, an hour code, a tens-of-minutes code, a minutes code, a tens-of-seconds code, and a seconds code, whereby the time code is adapted to identify intervals to the second over a time of twenty-four hours.

12. An apparatus for identifying an individually numbered frame within a desired interval of predetermined length on a video tape having a synchronizing signal that has a magnetized rectangular synchronizing pulse for each frame and an applied information code within the desired interval and within a second interval immediately preceding the desired interval, the apparatus comprising in combination:
(a) means for detecting a header in the second interval to identify a beginning of identification;
(b) means for detecting a user code in the second interval;
(c) means for detecting a desired time code in the second interval that immediately precedes the desired interval;
(d) means for detecting a check sum in the second interval and termination of the second interval to indicate completion of the second interval and beginning of the desired interval; and (e) means for counting synchronizing pulses in the desired interval until the number of the individual frame is reached 13. An apparatus for applying an information code to identify an interval of predetermined length on a synchronizing track of a video recording tape of which the synchronizing track contains a magnetized rectangular synchronizing pulse for each frame, the magnetizing pulse including a leading edge that is used to develop a synchronizing signal and a trailing edge that is pulse-width modulated to enter the information code, the apparatus changing spacing of the trailing edge of the synchronizing pulse with respect to the leading edge, the apparatus comprising in combination:

(a) means for entering an identifying header on eleven consecutive synchronizing pulses;

(b) means for entering a four-digit BCD user code on about sixteen consecutive synchronizing pulses following the header;

(c) means for entering a time code in BCD on about nineteen consecutive synchronizing pulses following the user code; and (d) means for entering a check sum on about four consecutive synchronizing pulses following the time code to complete entry of the information code, whereby the information code is applied to fifty consecutive bits that span the predetermined length in a fifty-Hz system.

14. The apparatus of claim 13 wherein the time code comprises a two-bit tens of-hours code, a four-bit BCD hours code, a three-bit BCD tens-of-minutes code, a four-bit BCD minutes code, a three-bit BCD tens-of-seconds code, and a three-bit BCD seconds code, whereby the time code is adapted to identify intervals to the second over a time span of twenty-four hours.

15. A method of applying an information code to identify a two-second interval on a synchronizing track of a video recording tape of which the synchronizing track contains a magnetized rectangular synchronizing pulse for each frame, the magnetizing pulse including a leading edge that is used to develop a synchronizing signal, the method comprising the steps of:

(a) entering an identifying header on eleven consecutive synchronizing pulses;

(b) entering a four digit BCD user code on sixteen consecutive synchronizing pulses following the header;

(c) entering a time code in BCD on nineteen consecutive synchronizing pulses following the user code; and (d) entering a check sum on four consecutive synchronizing pulses following the time code to complete entry of the information code, whereby the information code is applied to fifty consecutive bits that span two seconds in a system that operates at fifty Hertz.

16. The method of claim 15 comprising in addition the steps of entering a dummy code in ten synchronizing pulses following the time code to complete the synchronizing code in sixty bits, whereby the synchronizing code spans two seconds in a system that operates at sixty Hertz.

17. The method of claim 15 wherein the header comprises a binary zero, nine consecutive binary ones, and a binary zero.

18. The method of claim 15 wherein the time code comprises a tens-of-hours code, an hour code, a tens-of-minutes code, a minutes code, a tens-of-seconds code, and a seconds code, whereby the time code is adapted to identify intervals to the second over a time of twenty-four hours.

19. A method of identifying an individually numbered frame within a desired two-second interval on a video tape having a synchronizing signal that has a magnetized rectangular synchronizing pulse for each frame and an applied information code within the desired two-second interval and within a second two-second interval immediately preceding the desired two-second interval, the method comprising the steps of:

(a) detecting a header in the second two-second interval to identify a beginning of identification;

(b) detecting a user code in the second two-second interval;

(c) detecting a desired time code in the second two-second interval that immediately precedes the desired two second interval;

(d) detecting a check sum in the second two-second interval and termination of the second two-second interval to indicate completion of the second two-second interval and beginning of the desired two-second interval; and (e) counting synchronizing pulses in the desired two second interval until the number of the individual frame is reached.

20. A method of applying an information code to identify a two-second interval on a synchronizing track of a video recording tape of which the synchronizing track contains a magnetized rectangular synchronizing pulse for each frame, the magnetizing pulse including a leading edge that is used to develop a synchronizing signal and a trailing edge that is pulse-width modulated to enter the information code, the method comprising the steps of:

(a) entering an identifying header on eleven consecutive synchronizing pulses;

(b) entering a four digit BCD user code on about sixteen consecutive synchronizing pulses following the header;

(c) entering a time code in BCD on about nineteen consecutive synchronizing pulses following the user code; and (d) entering a check sum on about four consecutive synchronizing pulses following the time code to complete entry of the information code, whereby the information code is applied to fifty consecutive bits that span two seconds in a fifty-Hz system.

21. The method of claim 20 wherein the time code comprises a two-bit tens-of-hours BCD code, a four-bit BCD hours code, a three-bit BCD tens-of-minutes code, a four bit BCD minutes code, a three-bit BCD tens-of-seconds code, and a three-bit BCD seconds code, whereby the time code is adapted to identify intervals to the second over a time span of twenty-four hours.

22. An apparatus for applying an information code to identify a two-second interval on a synchronizing track of a video recording tape of which the synchronizing track contains a magnetized rectangular synchronizing pulse for each frame, the magnetizing pulse including a leading edge that is used to develop a synchronizing signal, the apparatus comprising in combination:

(a) means for entering an identifying header on eleven consecutive synchronizing pulses;

(b) means for entering a four-digit BCD user code on sixteen consecutive synchronizing pulses following the header;

(c) means for entering a time code in BCD on nineteen consecutive synchronizing pulses following the user code; and (d) means for entering a check sum on four consecutive synchronizing pulses following the time code to complete entry of the information code, whereby the combined means apply the information code to fifty consecutive bits that span two seconds in a system that operates at fifty Hertz.

23. The apparatus of claim 22 comprising in addition means for entering a dummy code in ten synchronizing pulses following the time code to complete the synchronizing code in sixty bits, whereby the synchronizing code spans two seconds in a system that operates at sixty Hertz.

24. The apparatus of claim 22 wherein the header comprises a binary zero, nine consecutive binary ones, and a binary zero.

25. The apparatus of claim 22 wherein the time code comprises a tens-of-hours code, an hour code, a tens-of-minutes code, a minutes code, a tens-of-seconds code, and a seconds code, whereby the time code is adapted to identify intervals to the second over a time of twenty-four hours.

26. An apparatus for identifying an individually numbered frame within a desired two-second interval on a video tape having a synchronizing signal that has a magnetized rectangular synchronizing pulse for each frame and an applied information code within the desired two-second interval and within a second two-second interval immediately preceding the desired two-second interval, the apparatus comprising in combination:

(a) means for detecting a header in the second two-second interval to identify a beginning of identification;

(b) means for detecting a user code in the second two-second interval;

(c) means for detecting a desired time code in the second two-second interval that immediately precedes the desired two-second interval;

(d) means for detecting a check sum in the second two-second interval and termination of the second two-second interval to indicate completion of the second two-second interval and beginning of the desired two-second interval; and (e) means for counting synchronizing pulses in the desired two-second interval until the number of the individual frame is reached.

27. An apparatus for applying an information code to identify a two-second interval on a synchronizing track of a video recording tape of which the synchronizing track contains a magnetized rectangular synchronizing pulse for each frame, the magnetizing pulse including a leading edge that is used to develop a synchronizing signal and a trailing edge that is pulse-width modulated to enter the information code, the apparatus changing spacing of the trailing edge of the synchronizing pulse with respect to the leading edge, the apparatus comprising in combination:

(a) means for entering an identifying header on eleven consecutive synchronizing pulses;

(b) means for entering a four-digit BCD user code on about sixteen consecutive synchronizing pulses following the header;

(c) means for entering a time code in BCD on about nineteen consecutive synchronizing pulses following the user code; and (d) means for entering a check sum on about four consecutive synchronizing pulses following the time code to complete entry of the information code, whereby the information code is applied to fifty consecutive bits that span two seconds in a fifty-Hz system.

28. The apparatus of claim 27 wherein the time code comprises a two-bit tens-of-hours BCD code, a four-bit BCD hours code, a three-bit BCD tens-of-minutes code, a four-bit BCD minutes code, a three-bit BCD tens-of-seconds code, and a three-bit BCD seconds code, whereby the time code is adapted to identify intervals to the second over a time span of twenty-four hours.

* * * * *

UNITED STATES PATENT AND TRADEMARK OFFICE
CERTIFICATE OF CORRECTION

PATENT NO. : 5,018,027

DATED : May 21, 1991

INVENTOR(S) : Roggendorf

It is certified that error appears in the above-identified patent and that said Letters Patent is hereby corrected as shown below:

IN THE ABSTRACT:

Line 9, after "seconds" insert ",".

Column 2, line 30, after "interval" and before "Another" insert "."

Column 3, line 12, after "session" and before "A" insert ".".

Column 4, line 10, after "sixty" and before "Hz" insert "-".

Column 4, line 61, after "pulse" insert "-".

Column 9, line 28, after "," and before "whereby" begin a new line at left margin.

Column 10, line 27, after "two" insert "-".

Signed and Sealed this

First Day of December, 1992

*Attest:*

*Attesting Officer*

DOUGLAS B. COMER

*Acting Commissioner of Patents and Trademarks*